Sept. 11, 1956   L. S. JAWORSKI   2,762,597
ONE-PIECE SPRING METAL CAPACITOR CASE BRACKET
Filed July 1, 1953
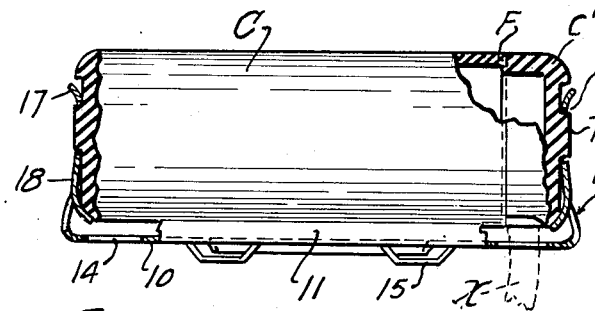
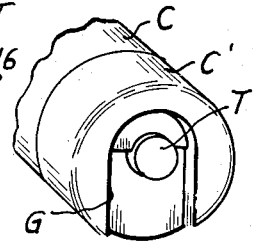
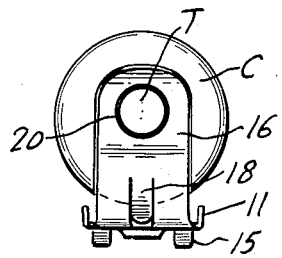
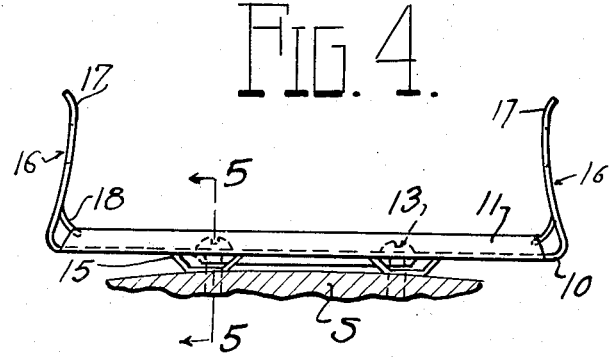
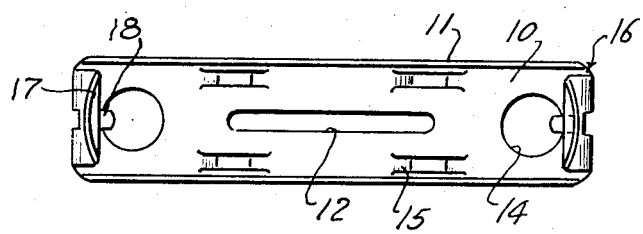
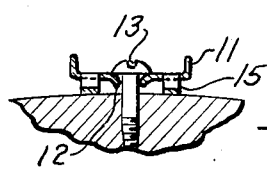
INVENTOR.
Leonard S. Jaworski
BY
ATTORNEY

United States Patent Office 2,762,597
Patented Sept. 11, 1956

2,762,597

ONE-PIECE SPRING METAL CAPACITOR CASE BRACKET

Leonard S. Jaworski, Toledo, Ohio, assignor to Prestole Corporation, Toledo, Ohio, a corporation of Michigan Application July 1, 1953, Serial No. 365,436

2 Claims. (Cl. 248—300)

This invention relates to fastening devices, but more particularly to a sheet metal bracket for supporting capacitor cases.

An object is to produce a simple and efficient bracket particularly although not exclusively adapted for capacitor cases of the type having a plastic body and cap closing one end.

Another object is to produce a spring metal bracket having resilient arms to engage the ends of the supported object and means associated with the arms for reenforcing and stiffening same thereby securely to retain the object against shifting and vibrational movements.

A further object is to produce a capacitor case bracket of spring sheet metal which is light in weight and grips the case at its ends and holds same in such position as to obviate vertical loads at right angles to the longitudinal axis of the case and also to eliminate unwarranted movement; enables the case to be readily applied but militates against disassembly.

A still further object is to produce a spring metal bracket having the new and improved features of construction and operation hereinafter described.

Other objects and advantages will hereinafter appear, and for purposes of illustration but not of limitation, an embodiment of the invention is shown on the accompanying drawings, in which:

Figure 1 is a side elevation partly in section of the sheet metal bracket to which the capacitor case is attached;

Figure 2 is a fragmentary perspective end view of the capacitor case showing the cap closing one end thereof;

Figure 3 is an end elevation of the bracket to which the capacitor case is applied;

Figure 4 is a side elevation of the spring metal bracket mounted on a support;

Figure 5 is a transverse sectional view substantially on the line 5—5 of Figure 4; and Figure 6 is a top plan view of the capacitor case bracket.

The illustrated embodiment of the invention comprises a one piece bracket of spring sheet metal having a horizontally disposed flat base 10 which is of elongate form and which is formed along the side edges with a pair of parallel upstanding flanges 11 extending substantially the entire length of the base. Intermediate the ends of the base 10 is an elongate slot 12, the edge portions of which as indicated on Figure 5, incline downwardly toward each other. The slot 12 is to receive attaching screws 13, two being shown for securing the bracket to a support S which, in this instance, is shown of curved form. Adjacent each end of the base 10 is a hole 14, and through one or the other of these holes extends a cable X leading from the capacitor, as will hereinafter appear.

Depending from the underside of the base 10 are legs 15, arranged in pairs and four being shown. These legs are arranged adjacent the sides of the base and are formed by forming a pair of parallel lances or slits and pressing the metal downwardly to form a substantially flat support-engaging foot or surface spaced below but substantially parallel to the plane of the base. In this manner, the base is spaced from the support S whether the support S has a curvilinear surface or is flat. By arranging the legs in the manner shown, it will be understood that when the attaching screws 13 are tightened, there is a tendency to depress the base along its central portion, causing the opposite ends of the base to rock or flex upwardly. The importance of this feature will hereinafter be described.

At each end of the base 10 is an upright arm 16 and particularly as shown on Figure 4, the arms 16 incline slightly toward each other. The extreme upper end of each arm 16 is curved outwardly as indicated at 17, to facilitate the mounting of the capacitor case by providing cam-like surfaces. Thus when the capacitor case is forced into engagement with the clip, the outwardly bent ends 17 are first engaged thereby to assist in flexing the arm 16 outwardly to admit the case into the desired position.

Each arm 16 has a struck-out tongue 18 adjacent its lower end, the tongues 18 being integral with the arms 16 at their upper ends so that the lower ends of the tongues are free to flex. Each tongue 18 is disposed approximately midway between sides of the respective arm 16 and is formed by a substantially U-shaped slit which commences in the region of the juncture of the respective arm 16 and the base 10 and terminates approximately a third of the length of the arm. The lower or free end of each tongue 18 is bent downwardly and inwardly for a purpose hereinafter to be described.

The above described bracket is particularly adapted for mounting capacitor cases such as the cylindrical case C which has a closed bottom and an open mouth closed by a cap C'. The case and its cap are of plastic material and of course, non-conductive. Formed in the cap C' is an inwardly extending relatively thin flange or lip of annular form which fits into the inside of the body of the case, such lip being shown at F on the drawing. This lip or flange can be readily broken in the event that the cap and body are shifted laterally with respect to each other, so that care must be taken to avoid such relative movement between the parts and such is achieved by the above described bracket, as will be more fully described hereinafter. On the closed end of the case C, as well as the closed end of the cap C', is a groove G which is open at one end and closed at the opposite end, and near the closed end of the groove G is an integral round stud T. Manifestly, the cap C' can be turned so that the grooves G at each end are similarly arranged and in such position, the case with its cap is applied to the bracket. In this connection, it will be observed that the open end of each groove G terminates in a rounded edge portion so that in applying the case and cap to the clip, this rounded portion engaging the outwardly curved ends 17 readily cam the arms 16 outwardly away from each other to admit the assembled case.

Directly beneath the outwardly curved end portion 17 are holes 20 into which the studs T snap, as shown in Figure 1. In this position, the lower edge of the groove G which is rounded, as above mentioned, engages the inwardly bent end of the respective tongue 18 just prior to or simultaneous with the entry of the studs T into the respective holes, in order further to urge each arm in an inward gripping direction. Thus the tongues 18 reenforce and stiffen the arms 16 after the flexing of these arms has taken place by the application of the assembled capacitor. These tongues also militate against horizontal movement of the case in an axial direction, thereby holding the cap securely against the case and obviating any liability of a gap occurring between the cap and the body. These tongues also afford additional precaution against vibratory noises which is particularly important where capacitors are mounted on domestic deep freeze units, air conditioners and other places where these noises are particularly objectionable. The tongues 18 also positively restrain the case from rotation or tendency to rotate because of any clearance that might occur between the arms 16 and the grooves G.

It was mentioned above that the application of the attaching screws 13 created a tendency of depressing the base slightly along the center portion. It will be manifest that this produces an additional clamping action with respect to the arms 16 further tightly to retain the case in the mounted position.

From the above description, it will be manifest that I have produced an exceedingly simple and efficient one-piece bracket of spring steel particularly adapted for capacitor cases and which produces easy flexing action and is capable of securely holding the case in position regardless of dimensional variations in the case. The bracket is light in weight so that shipping and handling costs of the assembled unit are reduced. The case is supported from the ends only so that objectionable vertical load on the assembly heretofore occasioned, and which resulted either in broken cases or undesirable gaps between the body and cover of the case, are eliminated. In this connection, it will be understood that heretofore capacitor cases engaged the face of the bracket and produced a vertical load at right angles to the axis of the case. The inwardly extending tongues are important because they reenforce and stiffen the arms 16 of the bracket after they have been flexed in the application of the case. These tongues further prevent horizontal movement of the case, and as above mentioned, provide additional assurance against vibrational noises. The tongues also prevent the case from rotating after it has been assembled on the bracket. The four legs 15 afford clearance between the support and the base of the bracket, and as above pointed out, afford a secondary strengthening effect for intimately holding the arms against the ends of the case.

It is to be understood that numerous changes in details of construction, arrangement, operation and choice of materials may be effected without departing from the spirit of the invention especially as defined in the appended claims.

What I claim is:

1. A spring metal bracket for supporting an elongate capacitor case and closure cap assembly having outwardly extending studs at opposite ends axially aligned with each other, said bracket comprising an elongate base, arms extending upwardly from the ends of the base respectively and inclining generally toward each other, a hole in each arm to receive one of said studs when the case is forced between the arms, and a tongue integral with the lower end of each arm having its free end extending inwardly in position to be engaged by the case substantially upon the entering of the studs into said holes, thereby to rigidify the arms and cause same intimately and tightly to grip the ends of the case, said tongue being struck from said arms and having free ends spaced upwardly from the base.

2. In the combination claimed in claim 1, upwardly extending flanges along the sides of the base, two pairs of legs depending from the base, the legs of each pair being laterally spaced and the pairs being spaced apart longitudinally, said base having therein a fastener-receiving aperture arranged approximately centrally of the base between the legs.

References Cited in the file of this patent

UNITED STATES PATENTS

| | | |
|---|---|---|
| 1,129,198 | Iddings | Feb. 23, 1915 |
| 1,805,742 | Reynolds | May 19, 1931 |
| 1,873,881 | Hall | Aug. 23, 1932 |
| 2,166,916 | Lombard | July 18, 1939 |
| 2,423,627 | Tinnerman | July 8, 1947 |
| 2,460,903 | Peck | Feb. 8, 1949 |